(12) United States Patent
McDonald et al.

(10) Patent No.: US 10,619,252 B2
(45) Date of Patent: Apr. 14, 2020

(54) WATER OXIDATION CATALYST INCLUDING COBALT MOLYBDENUM

(71) Applicant: Toyota Motor Engineering & Manufacturing North America, Inc., Erlanger, KY (US)

(72) Inventors: Kenneth James McDonald, Whitmore Lake, MI (US); Hongfei Jia, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 113 days.

(21) Appl. No.: 15/720,609

(22) Filed: Sep. 29, 2017

(65) Prior Publication Data

US 2018/0038000 A1     Feb. 8, 2018

Related U.S. Application Data

(63) Continuation of application No. 14/471,921, filed on Aug. 28, 2014, now Pat. No. 9,809,889.

(51) Int. Cl.
| | |
|---|---|
| C25B 1/00 | (2006.01) |
| C01G 51/00 | (2006.01) |
| C25B 1/04 | (2006.01) |
| C25B 11/04 | (2006.01) |
| C01B 3/04 | (2006.01) |
| B01J 23/882 | (2006.01) |

(52) U.S. Cl.
CPC ............. *C25B 1/003* (2013.01); *B01J 23/882* (2013.01); *C01B 3/042* (2013.01); *C01G 51/40* (2013.01); *C25B 1/04* (2013.01); *C25B 11/0452* (2013.01); *C01P 2002/72* (2013.01); *C01P 2002/85* (2013.01); *C01P 2004/03* (2013.01); *C01P 2004/64* (2013.01); *C01P 2006/40* (2013.01); *Y02E 60/364* (2013.01); *Y02E 60/368* (2013.01)

(58) Field of Classification Search
CPC ......... C01G 39/00–06; C01G 51/00–70; B01J 23/28; B01J 23/882
See application file for complete search history.

(56) References Cited

U.S. PATENT DOCUMENTS

| | | |
|---|---|---|
| 2,847,417 A | 8/1958 | Erner |
| 6,963,383 B2 | 11/2005 | Tokailin et al. |

(Continued)

FOREIGN PATENT DOCUMENTS

| | | |
|---|---|---|
| EP | 0099866 A1 | 2/1984 |
| JP | 2002170431 A | 6/2002 |

(Continued)

OTHER PUBLICATIONS

Hongfei Jia et al., "Different catalytic behavior of amorphous and crystalline cobalt tungstate for electrochemical water oxidation", RSC Advances, 2012, 2, pp. 10874-10881.

(Continued)

*Primary Examiner* — Nicholas A Smith
(74) *Attorney, Agent, or Firm* — Dinsmore & Shohl LLP

(57) ABSTRACT

A process for oxidizing water using hydrated cobalt molybdenum is disclosed. A plurality of hydrated cobalt molybdenum nanoparticles are supported on an electrode and are able to catalytically interact with water molecules generating oxygen. The catalyst can be used as part of an electrochemical or photo-electrochemical cell for the generation of electrical energy.

12 Claims, 8 Drawing Sheets

(56) References Cited

U.S. PATENT DOCUMENTS

| | | | |
|---|---|---|---|
| 7,357,907 | B2 | 4/2008 | Resasco et al. |
| 8,308,989 | B2 | 11/2012 | Adzic et al. |
| 2008/0223439 | A1 | 9/2008 | Deng et al. |
| 2009/0068541 | A1 | 3/2009 | Yan et al. |
| 2010/0101955 | A1 | 4/2010 | Nocera et al. |
| 2010/0133110 | A1 | 6/2010 | Nocera et al. |
| 2010/0133111 | A1 | 6/2010 | Nocera et al. |
| 2010/0143811 | A1 | 6/2010 | Brimblecombe et al. |
| 2011/0127170 | A1 | 6/2011 | Gerken et al. |
| 2013/0037417 | A1 | 2/2013 | Jia et al. |

FOREIGN PATENT DOCUMENTS

| | | |
|---|---|---|
| JP | 2003200051 A | 7/2003 |
| WO | 2013022524 A2 | 2/2013 |

OTHER PUBLICATIONS

Mircea DINCâ et al., "Nickel-borate oxygen-evolving catalyst that functions under benign conditions", Proceedings of the National Academy of Sciences of the United States of America, 2010, 107, pp. 103337-10341.

Matthew W. Kanan et al., "In Situ Formation of an Oxygen-Evolving Catalyst in Neutral Water Containing Phasphate and Co2+", Science, Aug. 22, 2008, pp. 1072-1075, vol. 321.

Feng Jiao, "Nanostructured Cobalt Oxide Clusters in Mesoporous Silica as Efficient Oxygen-Evolving Catalysts", Angewandte Chemie, 48, Feb. 10, 2010, pp. 1841-1844.

Boon Siang Yeo and Alexis T. Bell, "Enhanced Activity of Gold-Supported Cobalt Oxide for the Electrochemical Evolution of Oxygen", Journal of the American Chemical Society, Mar. 2011, 133, pp. 5587-5593.

Qiushi Yin et al., "A Fast Soluble Carbon-Free Molecular Water Oxidation Catalyst Based on Abundant Metals", Science, 328, Apr. 16, 2010, pp. 342-345.

Suntivich et al., "A Perovskite Oxide Optimized for Oxygen Evolution Catalysis from Molecular Orbital Principles", Sciencexpress, Oct. 27, 2011, pp. 1-4 plus attachments.

Singh et al, "Novel $FeCr_{2-x}(MoO_4)_3$ electrocatalysts for oxygen evolution reaction", International Journal of Hydrogen Energy, Oct. 2012, pp. 15117-15124, vol. 37, Issue 20.

Kumar et al, "New ternary mixed oxides of Fe, Ni and Mo for enchanced oxygen evolution", International Journal of Hydrogen Energy, Oct. 2011, pp. 12698-12705, vol. 36, Issue 20.

Kumar et al., "New ternary Fe, Co, and Mo mixed oxide electrocatalysts for oxygen evolution", International Journal of Hydrogen Energy, Jul. 2011, pp. 8831-8838, vol. 36, Issue 15.

Singh et al., "Electrocatalytic properties of new spinel-type $MMoO_4$ (M = Fe, Co and ni) electrodes for oxygen evolution in alkaline solutions", International Journal of Hydrogen Energy, Aug. 2008, pp. 4260-4264, vol. 33, Issue 16.

Singh et al., "Electrochemical characterization of a new binary oxide of Mo with Co for O2 evolution in alkaline solution", Electrochimica Acta, Apr. 15, 2009, pp. 3020-3025, vol. 54, Issue 11.

SEM

Anhydrous CoMoO4

Hydrated CoMoO4
(smaller particles)

WATER OXIDATION CATALYST INCLUDING COBALT MOLYBDENUM

CROSS-REFERENCE TO RELATED APPLICATION(S)

This application is a continuation application of U.S. patent application Ser. No. 14/471,921, filed Aug. 28, 2014, the entire contents of which is incorporated herein by reference.

FIELD OF THE INVENTION

The invention relates to a process and apparatus of using cobalt molybdenum as a catalyst for the electrochemical and photochemical-electrolysis of water, and in particular to a process and apparatus using hydrated cobalt molybdenum as a catalyst for the photochemical-oxidation of water.

BACKGROUND OF THE INVENTION

Hydrogen has long been considered an ideal fuel source, as it offers a clean, non-polluting alternative to fossil fuels. One source of hydrogen is the splitting of water into hydrogen ($H_2$) and oxygen ($O_2$), as depicted in equation (1).

$$2H_2O \rightarrow O_2 + 2H_2 \quad (1)$$

In an electrochemical half-cell, the water-splitting reaction comprises two half-reactions:

$$2H_2 \rightarrow O_2 + 4H^+ + 4e^- \quad (2)$$

$$2H^+ + 2e^- \rightarrow H_2 \quad (3)$$

and hydrogen made from water using sunlight prospectively offers an abundant, renewable, clean energy source. However, the oxygen evolution half reaction is much more kinetically limiting than the hydrogen evolution half reaction and therefore can limit the overall production of hydrogen. As such, efforts have been made to search for efficient oxygen evolution reaction (OER) catalysts that can increase the kinetics of OER and increase the production of hydrogen from water. In particular, oxides of ruthenium and iridium have previously been identified. However, as they are among the rarest elements on earth, it is not practical to use these catalysts on a large scale. Therefore, improved OER catalysts would be very useful in the development of hydrogen as an alternative fuel source.

SUMMARY OF THE INVENTION

In one aspect there is disclosed a process for oxidizing water to produce oxygen. The process includes placing water in contact with hydrated cobalt molybdenum, the hydrated cobalt molybdenum catalyzing the oxidation of water and producing oxygen. The hydrated cobalt molybdenum can be a plurality of hydrated cobalt molybdenum nanoparticles which may or may not be attached to an electrode with an electrical potential applied between the electrode and the water to generate oxygen.

In a further aspect of the invention, a cell for oxidizing water to produce oxygen is disclosed. The cell comprises water and hydrated cobalt molybdenum, where the hydrated cobalt molybdenum catalyzes the oxidation of water and produces oxygen. The cell may further comprise a container to hold the water.

In yet a further aspect, a photo-sensitizer may be added to the water in contact with hydrated cobalt molybdenum and the water plus hydrated cobalt molybdenum plus photo-sensitizer mixture exposed to electromagnetic radiation. In this aspect, the photo-sensitizer provides an electrical potential between the hydrated cobalt molybdenum and the water. In some instances, the photo-sensitizer may be a ruthenium-tris(2,2'-bipyridal) compound, such as ruthenium-tris(2,2'-bipyridal) chloride.

BRIEF DESCRIPTION OF THE FIGURES

FIG. 7 is a graphical representation of percent oxygen produced as a function of time for a working potential applied to an ITO electrode coated with hydrated $CoMoO_4$ catalyst material;

DETAILED DESCRIPTION OF THE INVENTION

Figure 1:
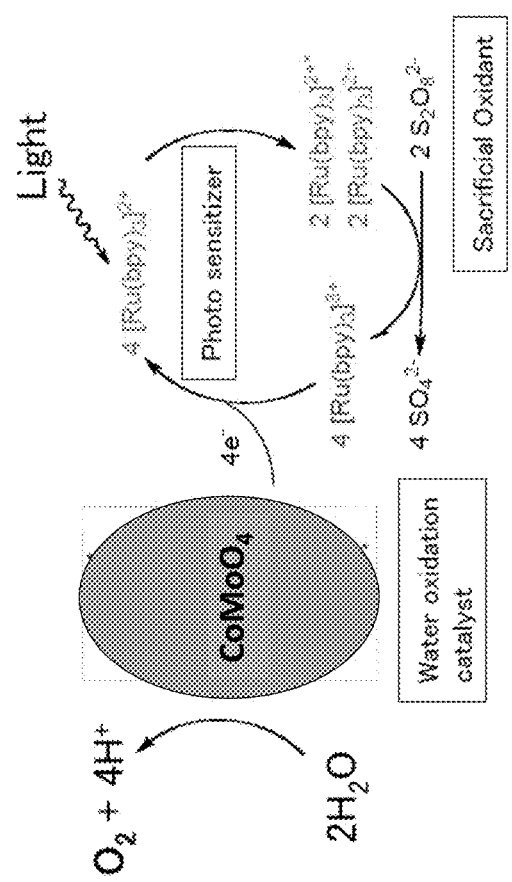
FIG. 1 is a schematic representation of the proposed mechanism by which cobalt molybdenum ($CoMoO_4$) serves as a water oxidation catalyst for converting water to its elemental components with electrons transferred to a sacrificial electron acceptor such as $[Ru(bpy)^3]^{3+}$ and $S_2O_8^{2-}$.

The present disclosure provides a method, apparatus and/or catalyst composition for the oxidation of water to generate oxygen gases. The method includes providing a hydrated cobalt molybdenum ($CoMoO_4$) catalyst material and adding the catalyst to water under a condition effective to generate oxygen. In one embodiment, the method further includes exposing the water, which contains the catalyst, to light radiation to generate oxygen gases.

A "catalyst" as used herein, means a material that is involved in and increases the rate of a chemical electrolysis reaction (or other electrochemical reaction) and which itself, undergoes reaction as part of the electrolysis, but is largely unconsumed by the reaction itself, and may participate in multiple chemical transformations. A catalytic material of the invention may be consumed in slight quantities during some uses and may be, in many embodiments, regenerated to its original chemical state. The reaction may include a water oxidation or oxygen evolution reaction.

In one aspect a water oxidation catalyst or an oxygen evolution catalyst includes hydrated cobalt molybdenum that splits water into oxygen and hydrogen ions.

In a further aspect there is disclosed an electrode for electrochemical water oxidation splitting water into oxygen and hydrogen ions that includes a substrate and an active material in contact with the substrate. The active material includes hydrated cobalt molybdenum.

In one aspect, the hydrated cobalt molybdenum may be combined with conductive particles such as carbon black and may also include a binder such as NAFION®, a sulfonated tetrafluoroethylene based fluoropolymer copolymer sold by DuPont. The combined material may be attached to an electrode substrate using any method known to those in the art. Various electrode substrates may be utilized that are capable of conducting current such as for example, glassy carbon, carbon black or other materials.

The catalyst can include a plurality of hydrated cobalt molybdenum nanoparticles. In some instances, the nanoparticles are uniform in size and can have an average particle size of less than 100 nm. In one embodiment, the hydrated cobalt molybdenum is attached to an electrode using any method known to those in the art. For example for illustrative purposes only, absorption techniques, adhesives, deposition techniques and the like can be used to attach the hydrated cobalt molybdenum to the electrode.

In some instances, the electrode can have channels and water can be brought into contact with the catalyst at a rate that allows the water to be incorporated into the electrode channels. In addition, the electrode can be in an aqueous solution and/or be part of an electrochemical cell and/or part of a photo-electrochemical cell, which may or may not include a container.

The container may be any receptacle, such as a carton, can or jar, in which components of an electrochemical device may be held or carried. A container may be fabricated using any known techniques or materials, as will be known to those of ordinary skill in the art. The container may have any shape or size, providing it can contain the components of the electrochemical device. Components of the electrochemical device may be mounted in the container. That is, a component, for example, an electrode, may be associated with the container such that it is immobilized with respect to the container, and in some cases, supported by the container.

In some instances, an electrochemical cell containing an embodiment of the present invention offers a highly efficient method of splitting water using solar illumination, without the need for an applied potential. Upon oxidation of water at a photo-anode, hydrogen protons are generated which are then reduced to form hydrogen gas at a counter electrode. In addition, the oxygen and hydrogen generated from the cell can be passed directly to a fuel cell to generate further power.

In a further embodiment, the electrochemical cell can be driven either by a photo-anode such as a dye sensitized semiconductor or an external potential. The dye sensitized semiconductor acts as a chemical/photo-electrical relay system. For example and for illustrative purposes only, FIG. 1 illustrates a sequence of electron transfer that can occur in a photo-electrical relay system. Examples of such relay systems include ruthenium N-donor dyes such as ruthenium polypyridal dyes that can absorb visible light and accept electrons from a hydrated cobalt molybdenum catalyst material and thereby assist in the oxidation of water that is in contact with the catalyst. In some instances, the photo-sensitizer can be a ruthenium-tris(2,2'-bipyridyl) compound such as ruthenium-tris(2,2'-bipyridyl) chloride.

The invention is further described by the following examples, which are illustrative of specific modes of practicing the invention and are not intended as limiting the scope of the invention defined in the claims.

EXAMPLES

Example I

Preparation of Hydrated $CoMoO_4$

Starting materials of $Co(NO_3)_2.6H_2O$ (Mw=291.03 g/mol) and $Na_2MoO_4.2H_2O$ (Mw=241.95 g/mol) were purchased from Sigma-Aldrich and used directly without further purification. In a typical synthesis a (0.5M) $Na_2MoO_4$ solution was added drop-wise into a (0.5M) $Co(NO_3)_2$ solution with strong agitation. Following the reaction, the solution mixture was rinsed with water on a centrifuge and the particles were then washed with ethanol prior to drying overnight in an oven at 35° C. The final product was a purple powder material.

Figure 2:
FIG. 2 is a pair of scanning electron microscopy (SEM) images of hydrated $CoMoO_4$ nanoparticles and anhydrous $CoMoO_4$ particles.
Figure 2:
Figure 3:
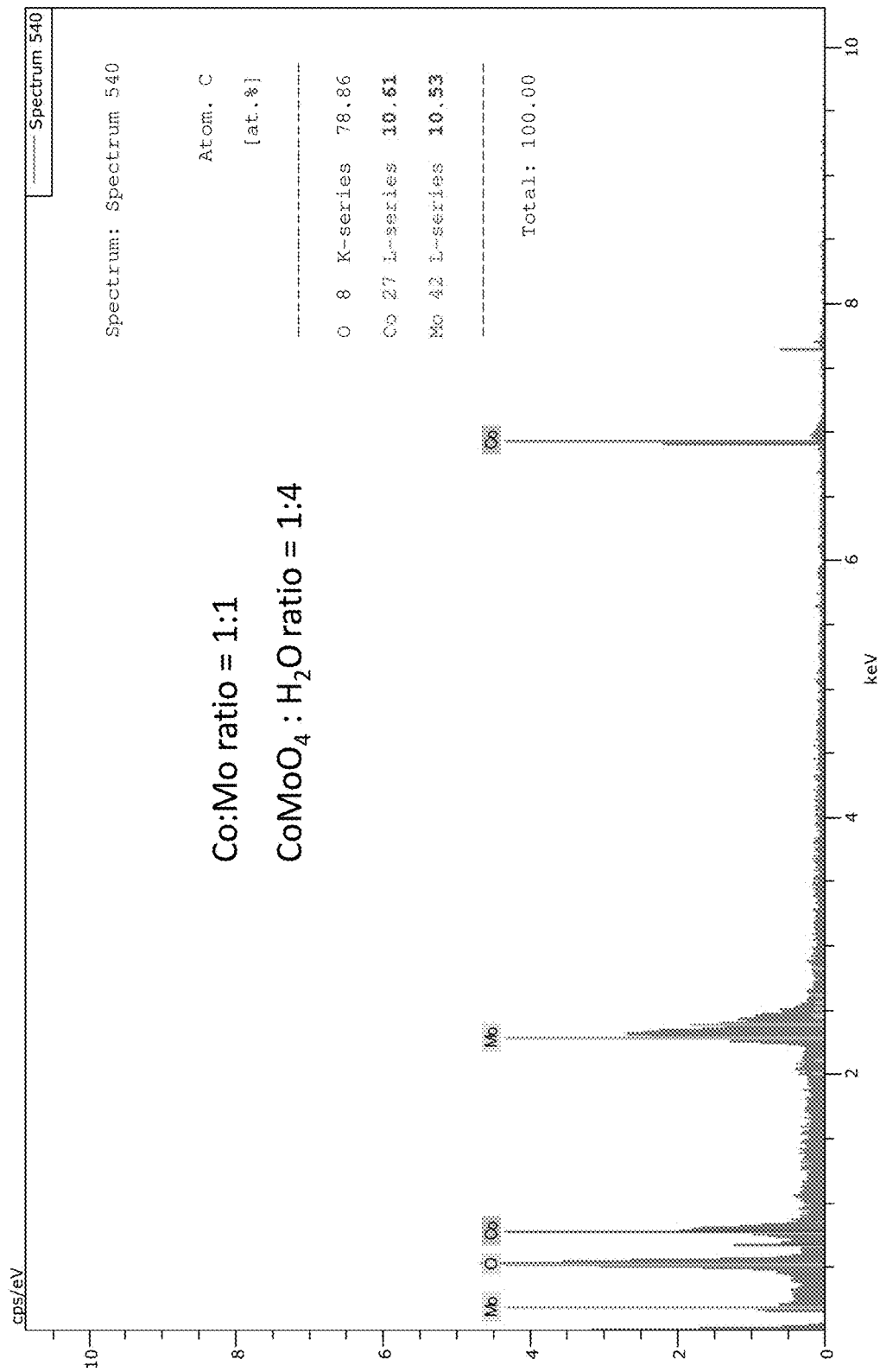
FIG. 3 is an EDX plot of the hydrated $CoMoO_4$ catalyst material.

A final powder product was examined by SEM as shown in FIG. 2. It can be seen in the Figure that the hydrated CoMoO4 particles had a smaller size in comparison to the anhydrous particles. The powder particles were also subjected to energy dispersive x-ray (EDX) analysis as depicted in FIG. 3 with an average particle size of less than 100 nm confirmed along with the presence of cobalt, molybdenum, and oxygen. The analysis indicates Cobalt:Molybdenum ratio of 1:1 and a $CoMoO_4:H_2O$ ratio of 1:4.

Figure 4:
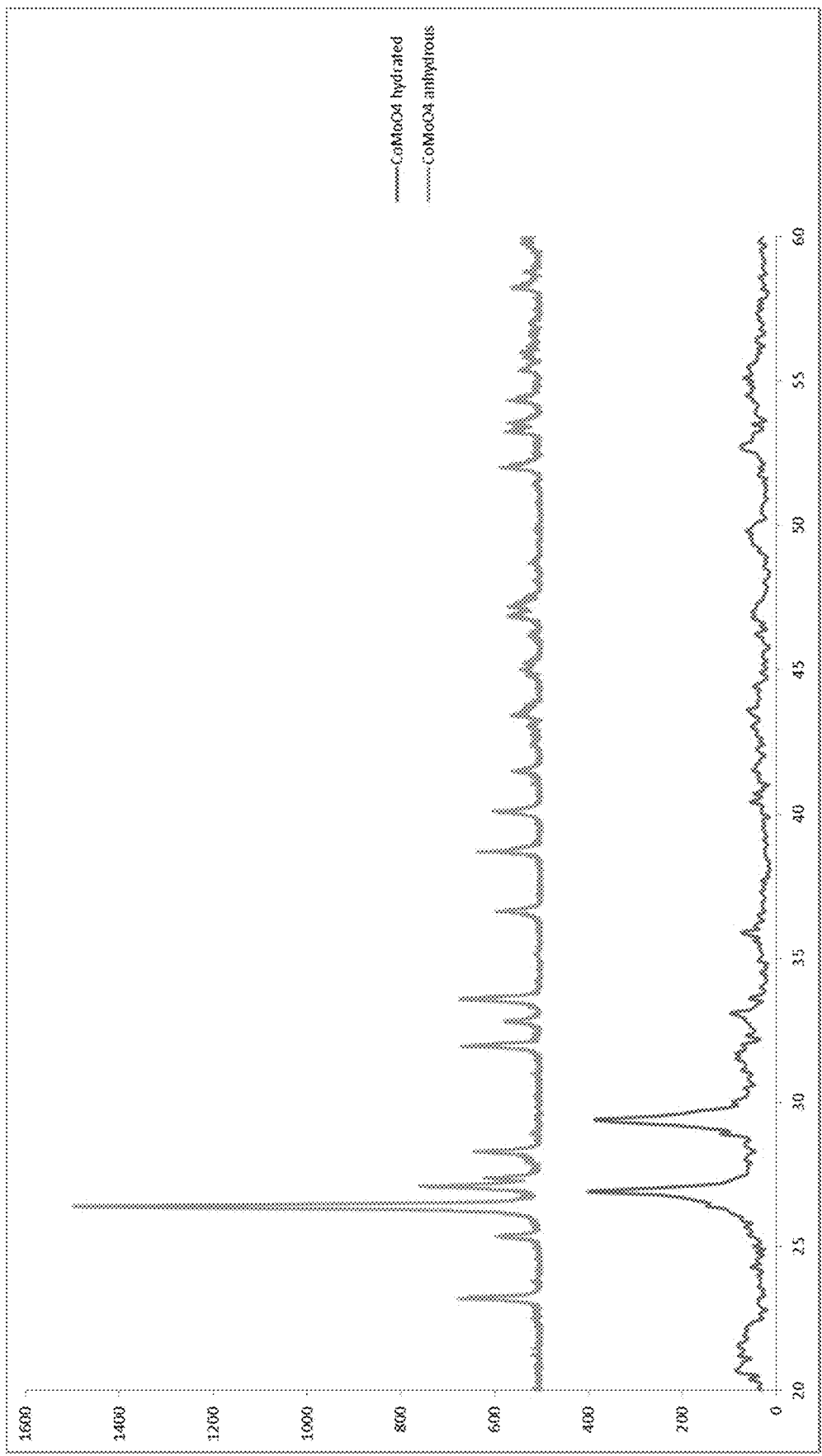
FIG. 4 is an XRD plot of hydrated $CoMoO_4$ nanoparticles and anhydrous $CoMoO_4$ particles.

XRD data as shown in FIG. 4 is shown for hydrated $CoMoO_4$ and anhydrous $CoMoO_4$. The data indicates that a $CoMoO_4:H_2O$ ratio may be from 1:1 to 1:3 for the hydrated $COMoO_4$ material.

Example II

Cyclic Voltammetry (CV) of $CoMoO_4$

Carbon paste electrodes were prepared by grinding $CoMoO_4$ nanoparticles produced according to Example I above with carbon paste (BASI, CF-1010). The $CoMoO_4$-loaded carbon paste was then loaded onto an electrode body (BASI, MF-2010) and sanded to produce a working electrode. Alternatively the electrodes were produced by combining $CoMoO_4$ particles as produced above with carbon black using Nafion as a binder material. The material was then drop cast onto a glassy carbon electrode.

The CV studies were performed in a simple 3-electrode cell with Ag/AgCl and Pt wire as reference and counter electrodes, respectively. The electrolyte had a pH of 8 and was obtained with a phosphate buffer at concentrations of 50 and 200 mM. Typical scan rates were 5 and 25 mV/s.

Figure 5:
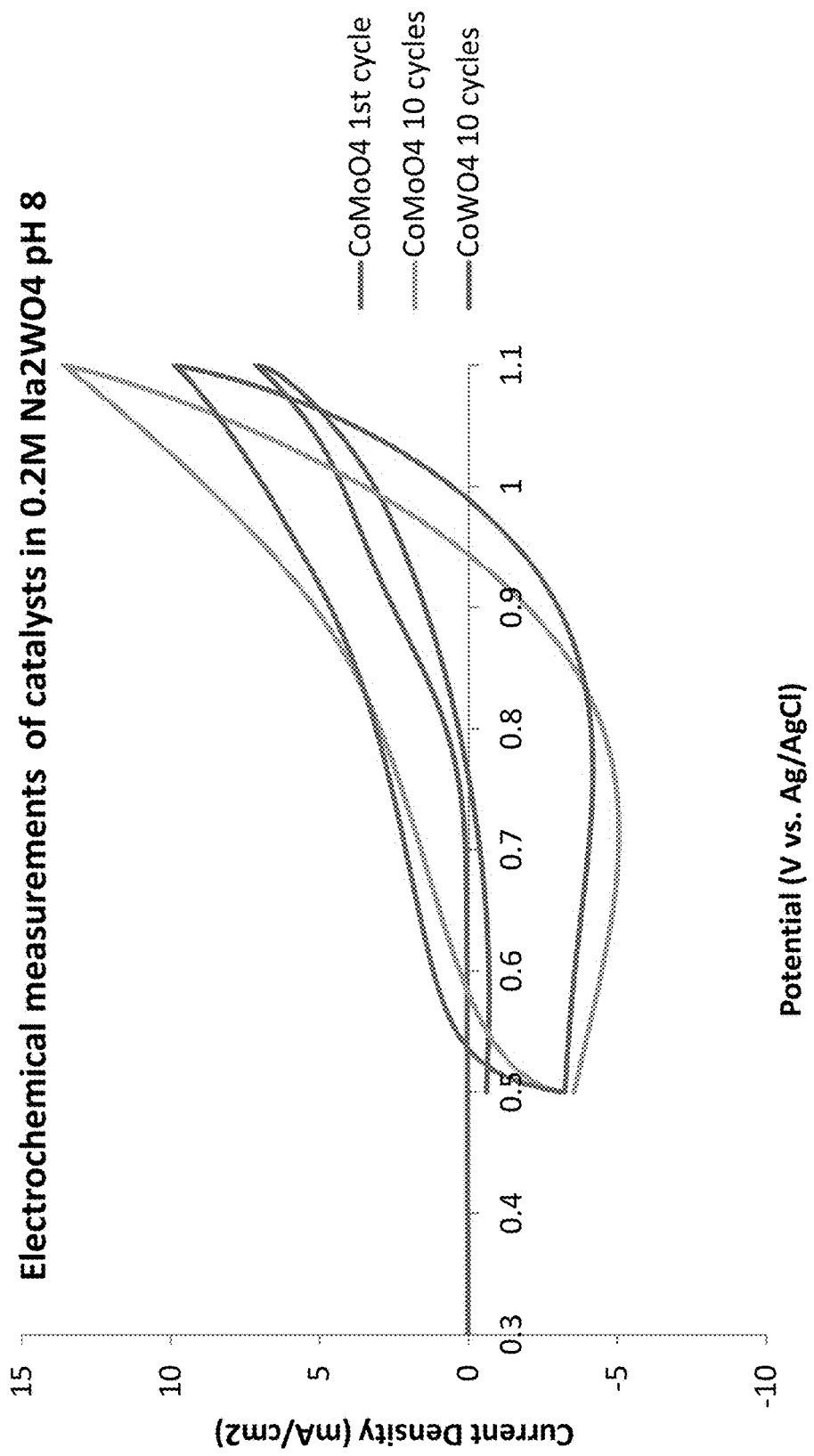
FIG. 5 is a graphical representation of cyclic voltammetry traces using a scan rate of 5 mV/s for $CoMoO_4$-carbon paste electrode for one cycle, after 10 cycles and for a $CoWO_4$ electrode after 10 cycles.

Cyclic voltammogram traces for the $CoMoO_4$ particles after one cycle, 10 cycles and for $CoWO_4$-loaded carbon paste electrodes are shown in FIG. 5. As shown in the figure the hydrated $CoMoO_4$ particles after 10 cycles have an increased performance at an applied potential of 1.1 V in comparison to particles of $CoMoO_4$ particles on a first cycle and particles of $CoWO_4$ following 10 cycles.

Figure 6:
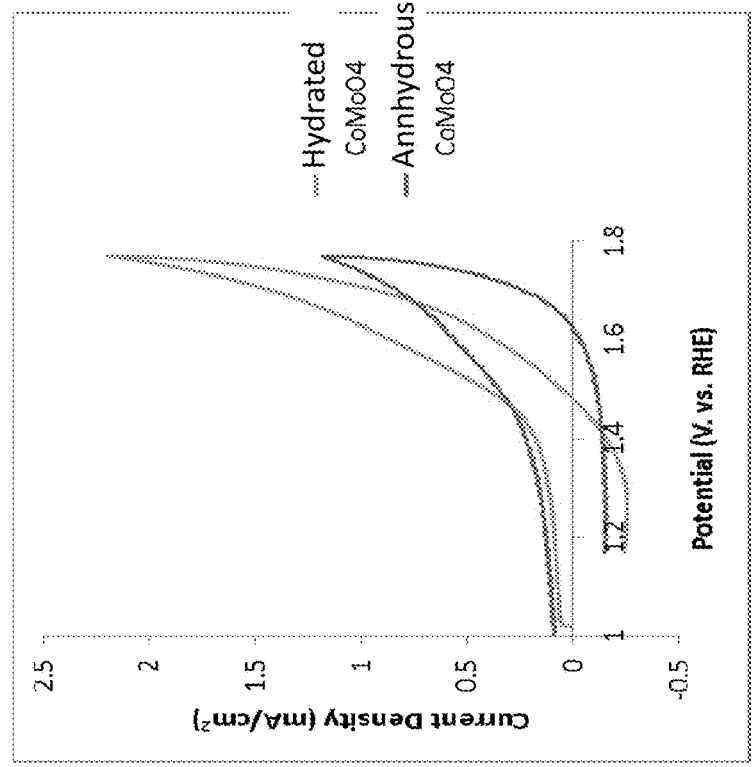
FIG. 6 is a graphical representation

Tafel plot measurements, as shown in FIG. 6 of hydrated and anhydrous $CoMoO_4$ show that hydrated $CoMoO_4$ has significantly better performance per unit of surface area than anhydrous $CoMoO_4$ under the same conditions and applied overpotential. The performance characteristics of the hydrated $CoMoO_4$ at a pH of 8, a desirable range of pH for an electrochemical cell for splitting water indicates an improved electrochemical catalyst for splitting water than may be produced in a large scale using a hydrothermal reaction.

Example III

Deposition of $CoMoO_4$ on Indium Tin Oxide Electrode

Indium tin oxide (ITO) electrodes were selected for additional water oxidation testing with ITO glass slides measuring 25×75 mm purchased from SPI Supplies (#6415-CF). ITO electrodes were produced by cutting an ITO glass slide into four equal pieces using a diamond blade, each ITO glass slide producing four ITO electrodes.

To immobilize or attach hydrated $CoMoO_4$ nanoparticles on an ITO electrode, cobalt molybdenum nanoparticles produced according to Example I were first dispersed in ethanol. A typical dispersion solution contained 10 mg of $CoMoO_4$ nanoparticles in 1 ml of ethanol. The dispersion solution was sonicated for approximately 20 minutes and the $CoWO_4$ nanoparticles remained well-dispersed for up to several days in the ethanol.

Deposition of $CoMoO_4$ nanoparticles onto ITO glass slides was performed using a dipping technique and a Nima Dip Coater in order to achieve uniform coating. The $CoMoO_4$-ITO electrodes were then baked in an oven at 150° C. for one hour.

Example IV

Verification of Oxygen Production

Figure 7:
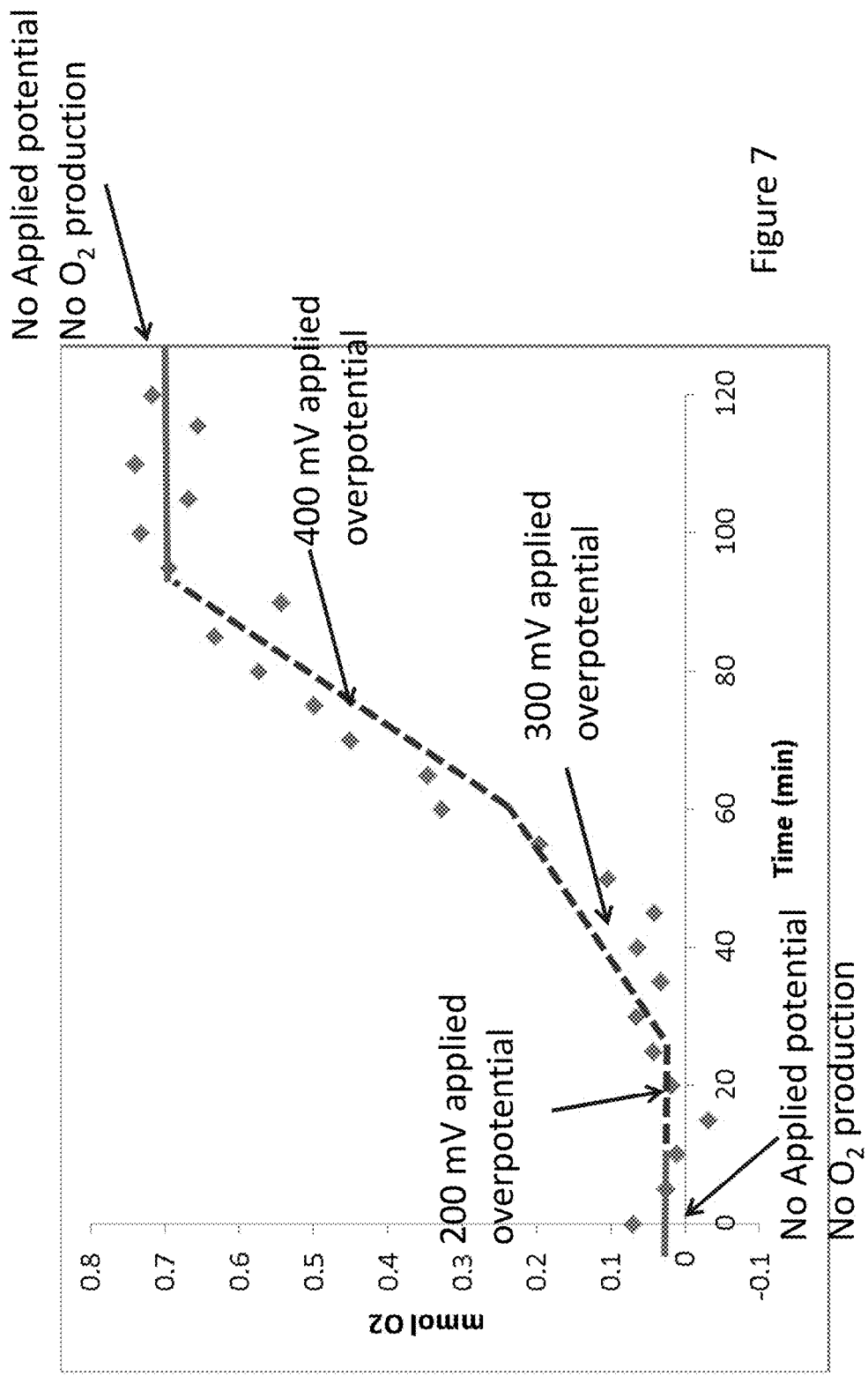
FIG. 7 is a plot of the electrochemical performance including the over potential versus the current density for hydrated $CoMoO_4$ and anhydrous $CoMoO_4$.

An air-tight H-cell was designed to quantify oxygen production in the cell. A copper rod with an alligator clip was attached at one end to hold the $CoMoO_4$-ITO electrode, while Ag/AgCl and platinum coils were used as reference and counter electrodes, respectively. The two chambers in this H-cell were typically filled with 35 ml of pH 8 phosphate buffer (200 mM). The electrode area was controlled by covering the undesired area with Teflon tape. The typical electrode area used in these studies was 1 $cm^2$ and scan rates of 5 and 25 mV/s were used for a potentiostatic study in which real-time monitoring of the concentration of dissolved oxygen in the electrolyte was performed. The study included a $CoMoO_4$-ITO working electrode being set at voltages between 0.8-1.3 V versus the Ag/AgCl reference electrode for 15 minutes under each applied potential, and the concentration of oxygen near the electrode was recorded continuously throughout the study. As shown in FIG. 7, an increase in oxygen concentration was observed at voltages as low as 1.0 V (~200 mV overpotential) with subsequent increases in the oxygen concentration at higher over potentials of 300 and 400 mV. A drop in oxygen concentration was also observed when there was no potential applied. Without being bound by theory, this result suggests that $Co^{2+}$ ions might have been "activated" to $Co^{3+}$ or $Co^{4+}$ for catalytic oxidation of water.

Example V

Figure 8:
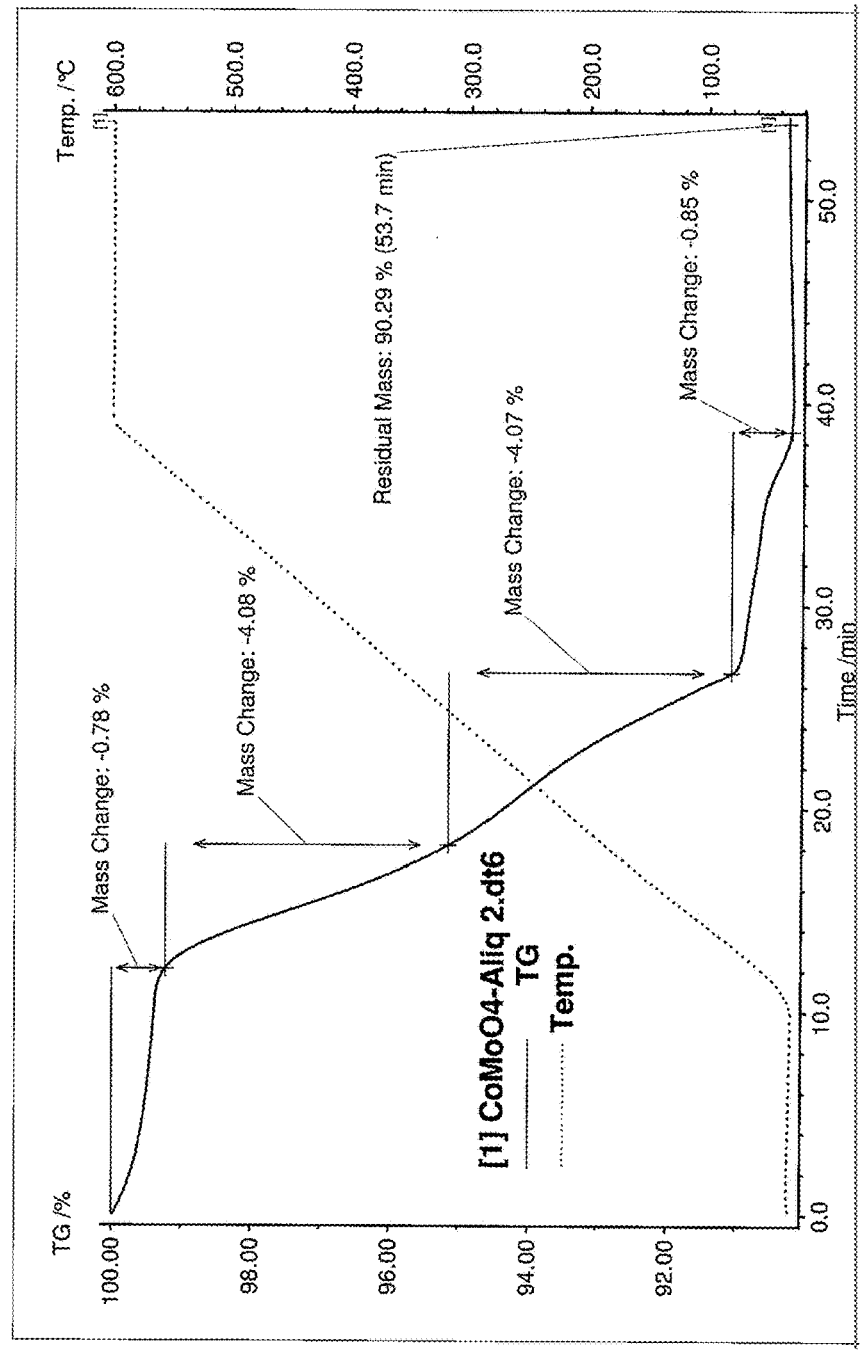
FIG. 8 is a graphical plot of TGA data for hydrated $CoMoO_4$

Referring to FIG. 8, there is shown a plot of the TGA analysis of the hydrated $CoMoO_4$ particles. The Total weight loss due to water by TGA was found to be approximately 10% with an atomic ratio of $CoMoO_4:H_2O$ to be approximately 1:1.

In one aspect, the atomic ratio of $CoMoO_4:H_2O$ may be from 1:1 to 1:4 as supported by the examples.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A cell for oxidizing water, said cell comprising:
   water and hydrated cobalt molybdenum in contact with said water;
   said hydrated cobalt molybdenum catalyzing the oxidation of water; and
   further including a photo-sensitizer in said water and an electromagnetic radiation source operatively arrange to expose said water with said photo-sensitizer to electromagnetic radiation, said photo-sensitizer providing an electrical potential between said hydrated cobalt molybdenum and said water.

2. The cell of claim 1, wherein said hydrated cobalt molybdenum is a plurality of hydrated cobalt molybdenum nanoparticles.

3. The cell of claim 1, further including said electrical potential applied between said hydrated cobalt molybdenum and said water.

4. The cell of claim 3, further including an electrode, said hydrated cobalt molybdenum attached to said electrode.

5. The cell of claim 1, wherein said photo-sensitizer is a ruthenium-tris(2,2'-bipyridyl) compound.

6. The cell of claim 1, wherein the hydrated cobalt molybdenum has a $CoMoO_4:H_2O$ ratio of from 1:1 to 1:4.

7. A water oxidation catalyst for splitting water into oxygen and hydrogen ions comprising hydrated cobalt molybdenum, conductive particles, and a binder combined with nanoparticles of hydrated cobalt molybdenum.

8. The water oxidation catalyst of claim 7 wherein the hydrated cobalt molybdenum has the formula: $CoMoO_4$.

9. The water oxidation catalyst of claim 7 wherein the hydrated cobalt molybdenum includes a plurality of nanoparticles having a size of less than one micrometer.

10. The water oxidation catalyst of claim 7 wherein the hydrated cobalt molybdenum has a $CoMoO_4:H_2O$ ratio of from 1:1 to 1:4.

11. An electrode for electrochemical water oxidation splitting water into oxygen and hydrogen ions comprising:
    a substrate;
    an active material in contact with the substrate, the active material including hydrated cobalt molybdenum; and
    conductive particles and a binder combined with nanoparticles of hydrated cobalt molybdenum;
    wherein water is split into oxygen and hydrogen ions.

12. The electrode of claim 11 wherein the hydrated cobalt molybdenum has a $CoMoO_4:H2O$ ratio of from 1:1 to 1:4.

* * * * *